(12) United States Patent
Stavrou

(10) Patent No.: US 10,113,564 B2
(45) Date of Patent: Oct. 30, 2018

(54) HYDRAULIC SYSTEM AND METHOD OF OPERATING THE SAME

(71) Applicant: Robert Bosch GmbH, Stuttgart (DE)

(72) Inventor: Paul C. Stavrou, Slatington, PA (US)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 15/389,586

(22) Filed: Dec. 23, 2016

(65) Prior Publication Data

US 2018/0180067 A1   Jun. 28, 2018

(51) Int. Cl.
| | |
|---|---|
| F16D 31/02 | (2006.01) |
| F15B 11/16 | (2006.01) |
| F16H 61/4078 | (2010.01) |
| E02F 9/22 | (2006.01) |
| F15B 15/28 | (2006.01) |

(52) U.S. Cl.
CPC .............. *F15B 11/16* (2013.01); *E02F 9/221* (2013.01); *F15B 15/2815* (2013.01); *F16H 61/4078* (2013.01); *F15B 2211/455* (2013.01); *F15B 2211/7052* (2013.01); *F15B 2211/7055* (2013.01); *F15B 2211/71* (2013.01); *F15B 2211/7733* (2013.01); *F15B 2211/78* (2013.01)

(58) Field of Classification Search
CPC ............. F15B 2211/7733; F16H 43/00; F16H 61/4078; E02F 3/045; E02F 9/221
See application file for complete search history.

(56) References Cited

U.S. PATENT DOCUMENTS

| | | | |
|---|---|---|---|
| 2,882,685 A * | 4/1959 | Carlsen | F16H 43/00 |
| | | | 60/375 |
| 3,319,530 A | 5/1967 | Sjöberg | |
| 3,815,473 A | 6/1974 | Jones, Jr. | |
| 4,342,255 A | 8/1982 | Watanabe et al. | |
| 4,369,625 A * | 1/1983 | Izumi | E02F 9/2292 |
| | | | 60/429 |
| 4,578,784 A | 3/1986 | Mifsud | |
| 5,048,394 A | 9/1991 | McLevige et al. | |
| 5,235,809 A | 8/1993 | Farrell | |
| 5,287,699 A | 2/1994 | Takamura et al. | |
| 5,665,919 A | 9/1997 | Woyski et al. | |
| 5,860,231 A | 1/1999 | Lee et al. | |
| 5,950,410 A | 9/1999 | O'Brien et al. | |
| 6,145,287 A * | 11/2000 | Rosskopf | F15B 11/17 |
| | | | 60/429 |
| 6,190,601 B1 | 2/2001 | Nakamura | |
| 6,763,661 B2 | 7/2004 | Tabor et al. | |
| 7,269,943 B2 | 9/2007 | Buckmier et al. | |
| 7,571,604 B2 | 8/2009 | Vigholm et al. | |
| 7,726,125 B2 | 6/2010 | Brinkman et al. | |

(Continued)

*Primary Examiner* — Michael Leslie
(74) *Attorney, Agent, or Firm* — Michael Best & Friedrich LLP

(57) ABSTRACT

A hydraulic system includes a pressure-driven actuator operable to provide a mechanical output in response to a pressure input, a single hydraulic circuit communicating with the pressure-driven actuator, a vibratory actuator in the single hydraulic circuit and operable to generate a first component of the mechanical output at a first frequency, and a hydraulic supply apparatus separate from the vibratory actuator, in the single hydraulic circuit, and operable to generate a second component of the mechanical output at a second frequency less than the first frequency.

20 Claims, 5 Drawing Sheets

(56) References Cited

U.S. PATENT DOCUMENTS

| | | | |
|---|---|---|---|
| 7,866,149 B2 | 1/2011 | Brinkman et al. | |
| 8,434,398 B2 | 5/2013 | Dutilleul | |
| 8,978,374 B2 * | 3/2015 | Opdenbosch | F15B 7/006 60/421 |
| 9,394,924 B2 * | 7/2016 | Berg | F16H 61/4078 |
| 9,651,065 B2 * | 5/2017 | Zipperer | F15B 13/0402 |
| 2005/0203691 A1 | 9/2005 | Kim | |

* cited by examiner

HYDRAULIC SYSTEM AND METHOD OF OPERATING THE SAME

FIELD OF THE INVENTION

The present invention relates to hydraulic systems, and more particularly to hydraulic systems operable to produce a mechanical output including an oscillatory component and a non-oscillatory component.

BACKGROUND OF THE INVENTION

Certain industrial processes use vibratory motion to move, settle, compact, mix, de-aerate, and otherwise manipulate materials and liquids. It is often a requirement in some processes to oscillate the machine member at a unique frequency or range of frequencies to meet a process requirement. In machines that have members required to make large movements, a corresponding large flow requirement requires that the system be sized to meet this requirement. These large systems capable of achieving large movements exhibit a reduced frequency response, making oscillation at higher frequencies difficult to obtain.

SUMMARY OF THE INVENTION

The present invention provides, in one aspect, a hydraulic system. The hydraulic system includes a pressure-driven actuator operable to provide a mechanical output in response to a pressure input, a single hydraulic circuit communicating with the pressure-driven actuator, a vibratory actuator in the single hydraulic circuit and operable to generate a first component of the mechanical output at a first frequency, and a hydraulic supply apparatus separate from the vibratory actuator, in the single hydraulic circuit, and operable to generate a second component of the mechanical output at a second frequency less than the first frequency.

The present invention provides, in another embodiment, a method of operating a hydraulic system to provide a mechanical output having an oscillatory component and a non-oscillatory component. The hydraulic system includes a single hydraulic circuit communicating with a pressure-driven actuator. A vibratory actuator in the single hydraulic circuit is actuated to generate the oscillatory component of the mechanical output. A hydraulic supply apparatus separate from the vibratory actuator and in the single hydraulic circuit is simultaneously actuated to generate the non-oscillatory component of the mechanical output.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
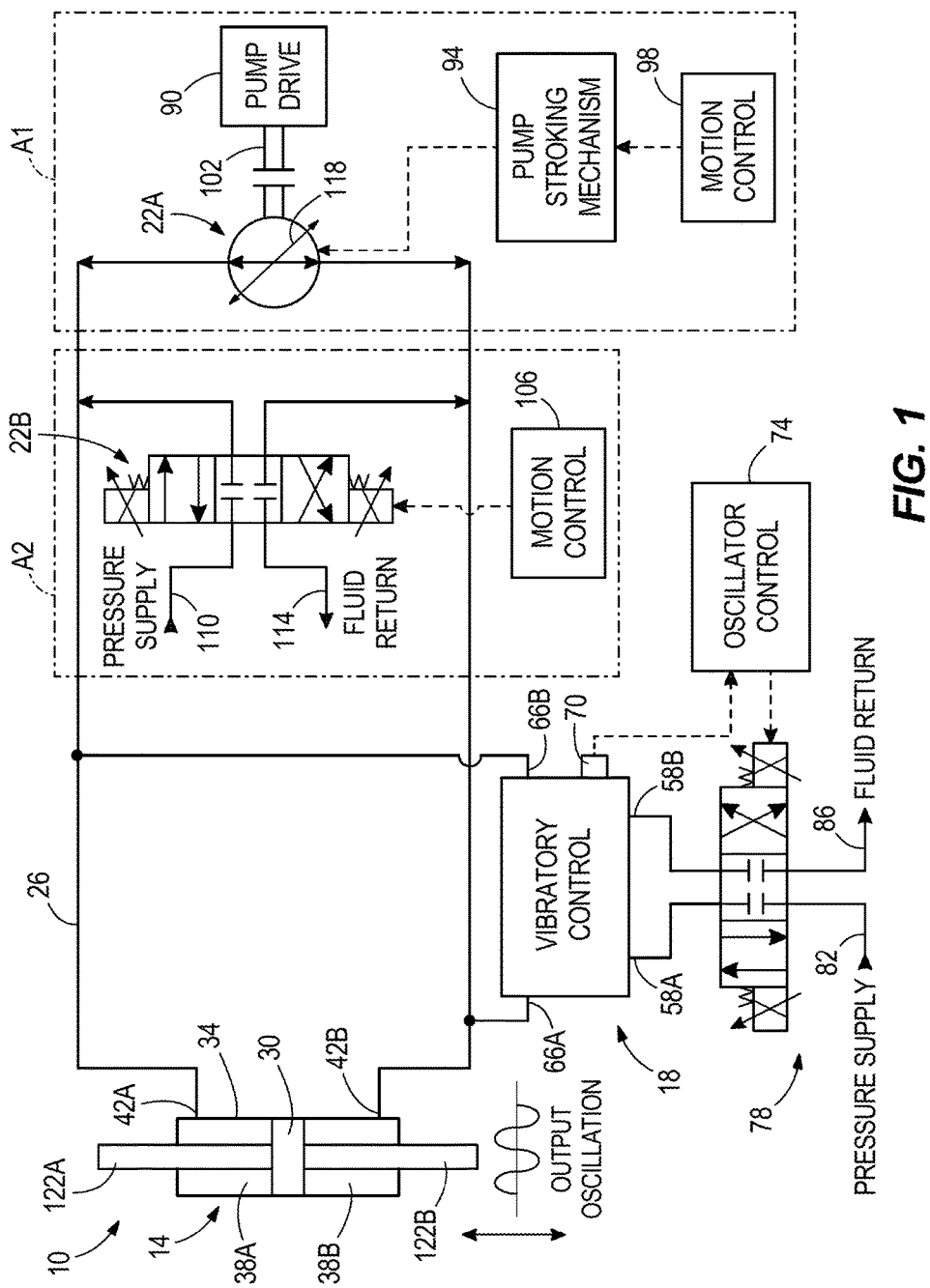
FIG. 1 is a schematic diagram of a hydraulic system including a vibratory actuator and two alternative hydraulic supply apparatus.

A hydraulic system 10 is shown in FIG. 1 and includes a main actuator or pressure-driven actuator 14 for producing a mechanical output in response to a hydraulic input from a vibratory actuator 18 and a hydraulic supply apparatus 22A or 22B. The hydraulic system 10 includes a single fluid circuit 26 for fluidly communicating an output of the vibratory actuator 18 and the hydraulic supply apparatus 22A or 22B with the pressure-driven actuator 14.

As shown in FIG. 1, the pressure-driven actuator 14 includes a piston 30 located within a piston chamber 34. The piston 30 divides the piston chamber 34 into a first chamber 38A in communication with the circuit 26 via a first inlet/outlet port 42A and a second chamber 38B in communication with the circuit 26 via a second inlet/outlet port 42B. When fluid is introduced into one of the ports 42A, 42B (i.e., functioning as an inlet) to move the piston 30, the other of the ports 42A, 42B serves as an outlet for transferring fluid from the piston chamber 34 to the hydraulic circuit 26. The piston 30 includes two opposing piston rods 122A, 122B that extend from the piston 30 through the first and second chambers 38A, 38B, respectively.

Figure 2:
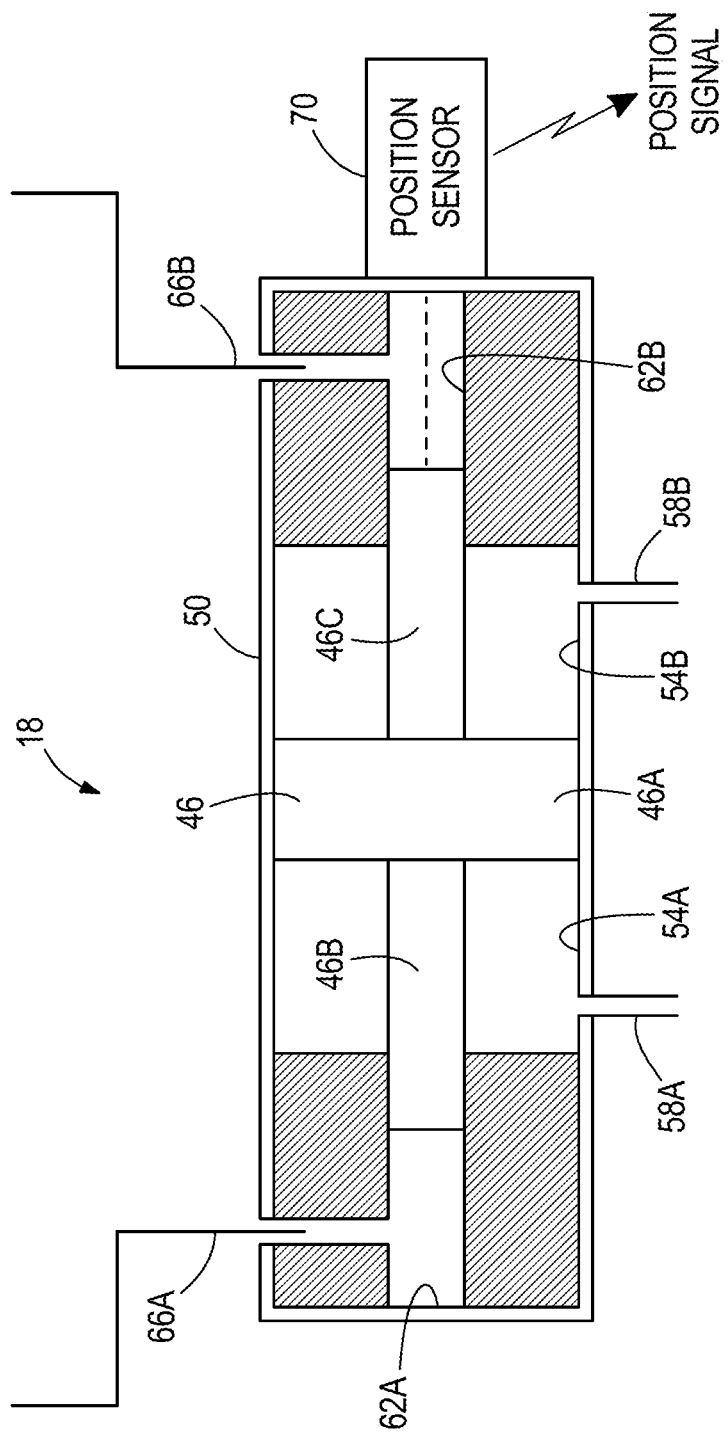
FIG. 2 is a schematic diagram of the vibratory actuator.

The vibratory actuator 18 is located in the circuit 26 as shown in FIG. 1, and is shown in greater detail in FIG. 2. The vibratory actuator 18 includes a piston 46 located within a piston chamber 50. The piston 46 translates longitudinally within the chamber 50 and includes three portions: a central portion 46A, a first auxiliary portion 46B, and a second auxiliary portion 46C. The auxiliary portions 46B, 46C extend from the central portion 46A and have smaller cross-sectional areas than the central portion 46A. The piston 46 divides the piston chamber 50 into four chambers: a first central chamber 54A in direct fluid communication with a first primary port 58A, a second central chamber 54B in direct fluid communication with a second primary port 58B, a first auxiliary chamber 62A in direct fluid communication with a first secondary port 66A, and a second auxiliary chamber 62B in direct fluid communication with a second secondary port 66B.

The vibratory actuator 18 further includes a position sensor 70. The position sensor 70 measures the location of the piston 46 within the piston chamber 50. The measured location is relayed to a controller 74. The controller 74 combines signals from sensors (e.g., the position sensor 70) with user inputs and predetermined processes to provide commands to the vibratory actuator 18.

The vibratory actuator 18 further includes a control valve 78 biased towards a neutral position. The control valve 78 is a proportional valve and transitions via one or more proportional solenoids or servo valve spool actuation apparatuses from the neutral position to a first position or a second position and may maintain one of a plurality of intermediate positions therebetween. In the neutral position as shown in FIG. 1, the valve 78 prohibits movement of the piston 46 by closing the circuit 26 off from a pressure supply line 82 and a fluid return line 86. In the first position, the control valve 78 connects the first central chamber 54A with the pressure supply 82 via the first primary port 58A. Concurrently, the control valve 78 connects the second central chamber 54B with the fluid return line 86 (i.e., at atmospheric pressure) via the second primary port 58B. In the second position, the control valve 78 connects the first central chamber 54A with the fluid return line 86 and connects the second central chamber 54B with the pressure supply line 82.

With the control valve 78 in the first position, the first central chamber 54A is provided with pressurized fluid from the pressure supply line 82, thereby providing a force upon the piston 46 (to the right in FIG. 2). Since the second central chamber 54B is connected to the return line 86, fluid is evacuated from the second central chamber 54B in response to the force applied to the piston 46 allowing the piston 46 to translate (to the right as shown in FIG. 2), increasing the size of the first central chamber 54A. Translation of the piston 46 further evacuates fluid from within the second auxiliary chamber 62B into the fluid circuit 26, and more specifically to the first port 42A of the actuator 14, thereby moving the piston 30. Therefore, in short, locating the control valve 78 in the first position translates the piston 30 in a first direction (downward as shown in FIG. 1).

With the control valve 78 in the second position, the second central chamber 54B is provided with pressurized fluid from the pressure supply line 82, thereby providing a force upon the piston 46 (to the left in FIG. 2). Since the first central chamber 54A is in communication with the return line 86, fluid pressure is evacuated from the first central chamber 54A in response to the force applied to the piston 46 allowing the piston 46 to translate (to the left as shown in FIG. 2), evacuating fluid from within the first auxiliary chamber 62A, to the fluid circuit 26 and the second port 42B of the actuator 14, thereby moving the piston 30. In short, locating the control valve 78 in the second position translates the piston 30 of the pressure-driven actuator 14 in a second direction (upward as shown in FIG. 1).

Figure 6:
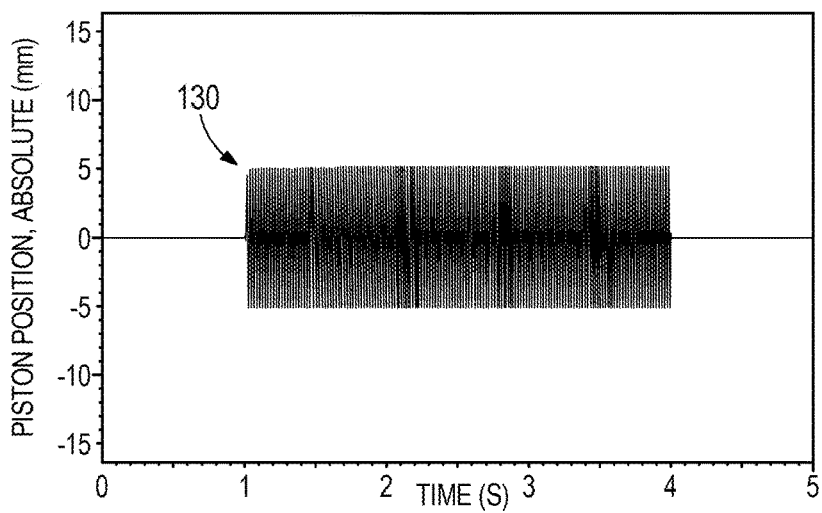
FIG. 6 is a graph illustrating an exemplary oscillating function.

In order to produce an oscillatory motion with the pressure-driven actuator 14, the control valve 78 of the vibratory actuator 18 transitions towards the first position and then towards the second position. The control valve 78 receives a signal from the controller 74 to switch directions in response to the location of the piston 46. The controller compares the current position of the piston 46, as measured by the position sensor 70, to a predetermined position and adjusts as necessary. The predetermined position may vary with time to produce the oscillatory motion, as shown in FIG. 6.

The magnitude that the piston 46 is capable of translating in response to pressure changes created by the control valve 78 is limited by the size of the chambers 54A, 54B, 62A, 62B. As increasing the size of the chambers is detrimental to the response time of the vibratory actuator 14, the hydraulic system 10 may be further provided with the separate hydraulic supply apparatus 22A or 22B.

As shown in FIG. 1, the hydraulic system further includes the hydraulic supply apparatus 22A or 22B, which, as shown, may be in the form of a hydraulic pump 22A or a proportional valve 22B. While a hydraulic system may be provided with both the hydraulic pump 22A and the proportional valve 22B in series, the pump 22A and valve 22B, as shown, are alternative options, as demarcated by dashed boxes A1, A2 indicative of a first alternative system and a second alternative system, respectively.

The first alternative system A1 includes a hydraulic pump 22A, a pump drive 90, a pump stroking mechanism 94, and a motion controller 98. The hydraulic pump 22A is driven by the pump drive 90 (e.g., an electric motor) via an input shaft 102. The hydraulic pump 22A is a variable displacement pump operable to increase fluid pressure within the hydraulic circuit 26. The amount of fluid pumped per revolution of the input shaft 102 of the pump 22A is variable in response to a change in the pump stroking mechanism 94. Further, the pump 22A is reversible such that the pump 22A is capable of producing flow in both directions (i.e., toward either of the inlet/outlet ports 42A, 42B). At times, the electric motor 90 may run at full speed without pumping and the pump stroking mechanism 94 is in a neutral position. However, in response to a request for load motion from the motion controller 98, the pump stroking mechanism 94 moves away from the neutral position to cause pump flow at the desired rate and in the desired direction. When pumping fluid in a first direction, the hydraulic valve 22B provides fluid to the first inlet/outlet port 42A and the first chamber 38A of the pressure-driven actuator 14 to move the piston 30 in the first direction. When the piston 30 is moved, fluid within the second chamber 38B is expelled through the second inlet/outlet port 42B and into the circuit 26. When pumping fluid in a second direction, opposite the first direction, the hydraulic valve 22B provides fluid to the second chamber 38B of the pressure-driven actuator 14 to move the piston 30 in the second direction, thereby introducing fluid from the first chamber 38A into the circuit 26. The motion controller 98 and the oscillator controller 74 may be a single controller or may be separate controllers.

The second alternative system A2 includes a hydraulic valve 22B and a motion controller 106. Similar to the control valve 78, the hydraulic valve 22B is a proportional valve and transitions via one or more proportional solenoids or servo valve spool actuation apparatuses between a neutral position, a first position, and a second position, and may be held at a plurality of positions therebetween. The hydraulic valve 22B separates the circuit 26 from a pressure supply line 110 and a fluid return line 114. The pressure supply 110 may be the same pressure supply as the one providing pressurized fluid to the vibratory control, or may alternatively be a separate pressure supply, operable to provide pressurized fluid at a higher or lower pressure. The fluid return line 114 provides a path for fluid to exit the circuit 26.

When in the neutral position shown in FIG. 1, the hydraulic valve 22B prohibits fluid flow from the pressure supply 110 into the circuit 26 and from the circuit 26 into the fluid return line 114. When transitioned towards the first position, the hydraulic valve 22B provides fluid to the first inlet/outlet port 42A and the first chamber 38A of the pressure-driven actuator 14 to move the piston 30 in the first direction. When the piston 30 is moved, fluid within the second chamber 38B is expelled through the second inlet/outlet port 42B and into the circuit 26, moving fluid in the circuit 26 through the valve 22B, and to the fluid return line 114. When transitioned towards the second position, the hydraulic valve 22B provides fluid to the second chamber 38B of the pressure-driven actuator 14 to move the piston 30 in the second direction, thereby introducing fluid from the first chamber 38A into the circuit 26 and moving fluid in the circuit 26 through the valve 22B, and to the fluid return line 114.

Therefore, the hydraulic supply apparatus 22A or 22B is capable of producing low frequency, high displacement outputs to the circuit 26, and therefore also to the pressure-driven actuator 14. The frequency and displacement are low and high, respectively, in comparison to the output from the vibratory actuator 18.

Figure 5:
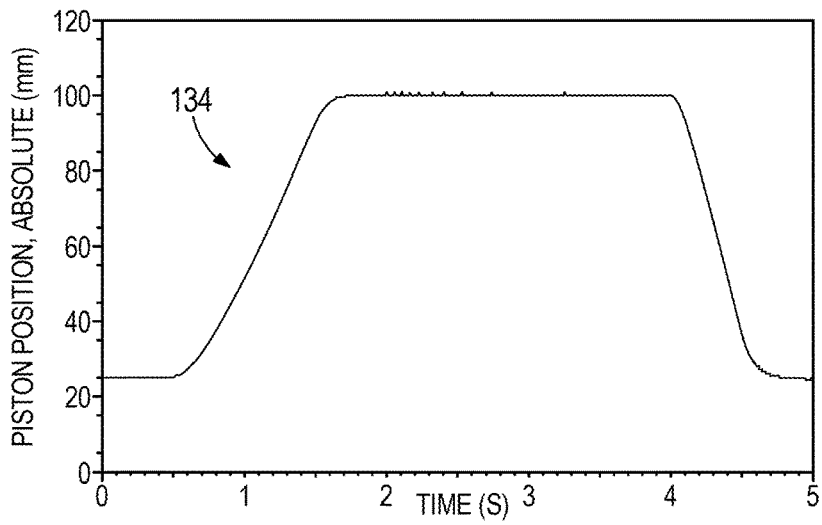
FIG. 5 is a graph illustrating an exemplary ramped step function.
Figure 7:
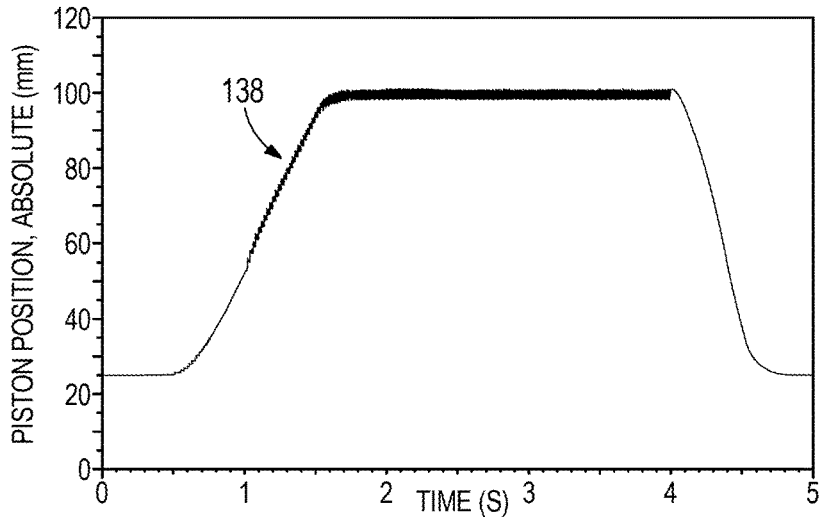
FIG. 7 is a graph illustrating an exemplary function including the ramped step function of FIG. 5 and the oscillating function of FIG. 6.

Therefore, the hydraulic system 10 is capable of producing an output of the pressure-driven actuator 14 that is, for example, a combination of a high frequency, low magnitude oscillation 130 (e.g., FIG. 6) and a low frequency, high magnitude ramped step function 134 (e.g., FIG. 5). An example of the combined output of these functions is shown in FIG. 7.

In operation, the user dictates the desired output of the pressure-driven actuator 14. This may be part of a predetermined program stored within the controller 74, 98, 106 or may be dependent upon real-time user input to an input device (not shown) such as a joystick or trigger. In response to the input, the controller 74, 98, 106 actuates the vibratory actuator 18 and the hydraulic supply apparatus 22A or 22B to produce the desired output. For example, to produce the output shown in FIG. 7, the hydraulic supply apparatus 22A or 22B is actuated by the motion controller 98, 106 to produce the ramped step function 134 shown in FIG. 5. At a time of 0.5 seconds, the pressure-driven actuator 14 is moved at a constant rate of 62.5 millimeters per second for 1.2 seconds (increasing the displacement of the piston 14 from 25 millimeters to 100 millimeters), holding the pressure (and therefore position of the pressure-driven actuator 14) steady for the following 2.3 seconds, and then ramping back down to the original displacement at a rate of 93.75 millimeters per second for 0.8 seconds. The ramped function 134 is considered linear despite non-linear transitions at the distal ends of the ramped portions of the function; as such non-linear transitions are present in any real-world example.

In order to carry out the abovementioned ramp function 134 with the first alternative A1 (the pump 22A), the pump 22A is driven by the pump drive 90 at a constant rate. At a time of 0.5 seconds, the motion controller 98 instructs (i.e. sends a signal to) the pump stroking mechanism 94 (e.g., to increase an angle of a swash plate 118 of the pump 22A) to increase the flow output of the pump 22A. The flow output of the pump 22A is proportional to the desired displacement of the piston 14. The pump stroking mechanism 94 holds or adjusts the angle of the swash plate 118 associated with the desired rate of displacement to linearly increase the fluid flow from the pump 22A for 1.2 seconds, thereby increasing fluid flow into the first chamber 38A via the first inlet/outlet port 42A. To hold the pressure, the swash plate 118 is returned to the neutral position for the following 2.3 seconds. The motion controller 98 then instructs the pump stroking mechanism 94 to reverse the flow of the pump 22A and increase the angle of the swash plate 118 in the opposite direction, such that fluid flow is directed towards the second inlet/outlet port 42B and second chamber 38B of the pressure-driven actuator 14 for 0.8 seconds before returning to the neutral position.

To carry out the abovementioned ramp function with the second alternative A2 (the hydraulic valve 22B), the valve 22B is controlled via the motion controller 106. Initially, the hydraulic valve 22B is biased towards the neutral position (as shown in FIG. 1). At a time of 0.5 seconds, the motion controller 106 instructs the hydraulic valve to transition from the neutral position to or towards the first position. The pressure supply 110 is in communication with the circuit 26 and the first inlet/outlet port 42A of the pressure-driven actuator 14 to move the piston 30 at a constant rate (e.g., 62.5 millimeters per second) based on the position of the hydraulic valve 22B. Simultaneously, the fluid within the second chamber 38B of the pressure-driven actuator 14 is moved out the second inlet/outlet port 42B, through the valve 22B and to the fluid return line 114. After 1.2 seconds, the hydraulic valve 22B returns to the neutral position, thereby locking the fluid within the circuit 26 and separating the circuit 26 and the chambers 38A, 38B of the pressure-driven actuator 14 from the pressure supply 110 and fluid return lines 114. After an additional 2.3 seconds, the valve 22B is instructed by the motion controller 106 to transition to or towards the second position. The pressure supply 110 is in communication with the circuit 26 and the second inlet/outlet port 42B of the pressure-driven actuator 14 to move the piston 30 at a constant rate (e.g., 93.75 millimeters per second) in the opposite direction for 0.8 seconds before returning to the neutral position.

Concurrent with the ramped step function 134 described above, the vibratory actuator 18 can be actuated by the controller 74 to produce the oscillating function shown in FIG. 6. At a time of 1.0 second, the piston 30 of the pressure-driven actuator 14 is oscillated at a rate of fifty oscillations per second, each oscillation displacing the piston 30 by 5.0 millimeters about the rest position (e.g., extending between 5.0 and −5.0 millimeters). After a duration of 3.0 seconds, the oscillatory function 130 is ceased.

To carry out the abovementioned oscillatory function 130, the vibratory actuator 18 is actuated. At a time of 1.0 seconds, the controller 74 sends a signal to the valve 78 to transition from the neutral position to or towards the first position. In such a position, the pressure supply line 82 provides pressurized fluid (i.e., at a flow rate dictated by the position of the valve 78) to the first central chamber 54A via the first primary port 58A. In response, the piston 46 within the vibratory actuator 18 translates until the valve 78 returns to the neutral position. The translation of the piston 46 displaces fluid from the second central chamber 54B through the second primary port 58B and to the fluid return line 86, thereby increasing the size of the first central chamber 54A and decreasing the size of the second central chamber 54B. Concurrently, the second auxiliary portion 46C of the piston 46 translates further into the second auxiliary chamber 62B, displacing fluid from the second auxiliary chamber 62B through the second secondary port 66B and to the circuit 26. The displacement of the piston 46 displaces fluid within the circuit 26 and to the first chamber 38A of the pressure-driven actuator 14 to move the piston 30 an amount relative to the displacement of the piston 46.

Fluid from the second chamber 38B of the pressure-driven actuator 14 is expelled through the second inlet/outlet port 42B in response to the translation of the piston 30. The fluid introduced into the circuit 26 through the second inlet/outlet port 42B in response to the input from the vibratory actuator 18 is not felt by the hydraulic supply apparatus 22A or 22B because the amount of fluid displaced by the piston 46 is equivalent to the amount vacated from the second auxiliary chamber 62B of the vibratory actuator 18. The first auxiliary chamber 62A increases in size proportional to the decrease of the second auxiliary chamber 62B to accept additional fluid from the circuit 26 through the first secondary port 66A equivalent to the amount expelled from the second chamber 38B of the pressure-driven actuator 14.

As the vibratory actuator 18 and the hydraulic supply apparatus 22A or 22B are located in a single circuit 26, the position sensor 70 monitors any change in the position of the piston 46 produced by the hydraulic supply apparatus 22A or 22B. For example, if the hydraulic supply apparatus 22A or 22B is instructed to produce a ramp function with a magnitude of 100 millimeters as shown in FIG. 5, the circuit 26 is pressurized upstream of the first inlet/outlet port 42A. Based on the schematic of FIG. 1, the pressurized portion of the circuit 26 is also in fluid communication with the second secondary port 66B of the vibratory actuator 18. The increase in pressure pushes on the piston 46 of the vibratory actuator 18, offsetting it from the desired position. The position sensor 70 records such changes at all times and the controller 74 provides instructions to the control valve 78 to counteract the change, maintaining the desired position. Therefore, when the valve 78 of the vibratory actuator 14 is described as being in the neutral position, it may be holding a position between the first position and the second position that counteracts the fluid pressure from the hydraulic supply apparatus 22A or 22B.

When the piston 46 has traveled the desired amount to create a peak of a first oscillation in the desired amount of time, the valve 78 transitions to or towards the second position. The valve 78 may transition in response to a signal from the controller 74 indicative of the position of the piston 46 (i.e., from the position sensor 70) or may otherwise transition in response to a signal from the controller 74 indicative of the time (i.e., relative to the time that the valve 78 previously transitioned to or towards the first position). In the second position, the pressure supply line 82 introduces additional fluid into the second central chamber 54B via the second primary port 58B, thereby displacing the piston 46 and introducing additional fluid into the circuit 26 and the second chamber 38B of the pressure-driven actuator 14 via the first secondary port 66A and the second inlet/outlet port 42B, respectively. The piston 30 of the pressure-driven actuator 14 is therefore displaced in the opposite direction, thereby creating a second oscillatory peak. The vibratory actuator 18 repeats this process to produce the oscillatory function 130 at the rate and magnitude prescribed by the controller 74 until the oscillatory function 130 is ceased (e.g., after 3.0 seconds of oscillation; at about t=4.0 seconds). When the oscillatory and ramp functions 130, 134 are performed concurrently, the resultant function 138 is produced, as shown in FIG. 7.

While the outputs of the vibratory actuator 18 and hydraulic supply apparatus 22A or 22B may be applied concurrently, this is not required at all times. For example, as shown in the exemplary graphs of FIGS. 5-7, the ramped step function 134 begins to climb from the base value to the peak value between 0.5 and 1.2 seconds and the oscillatory function 130 does not begin until a time of 1.0 seconds. Likewise, the oscillatory function 130 concludes prior to the ramped step function 134 returning to the base value. These exemplary outputs are only a few possible outputs and those of skill in the art will understand that an infinite number of output curves can be created depending on the desired output.

Figure 3:
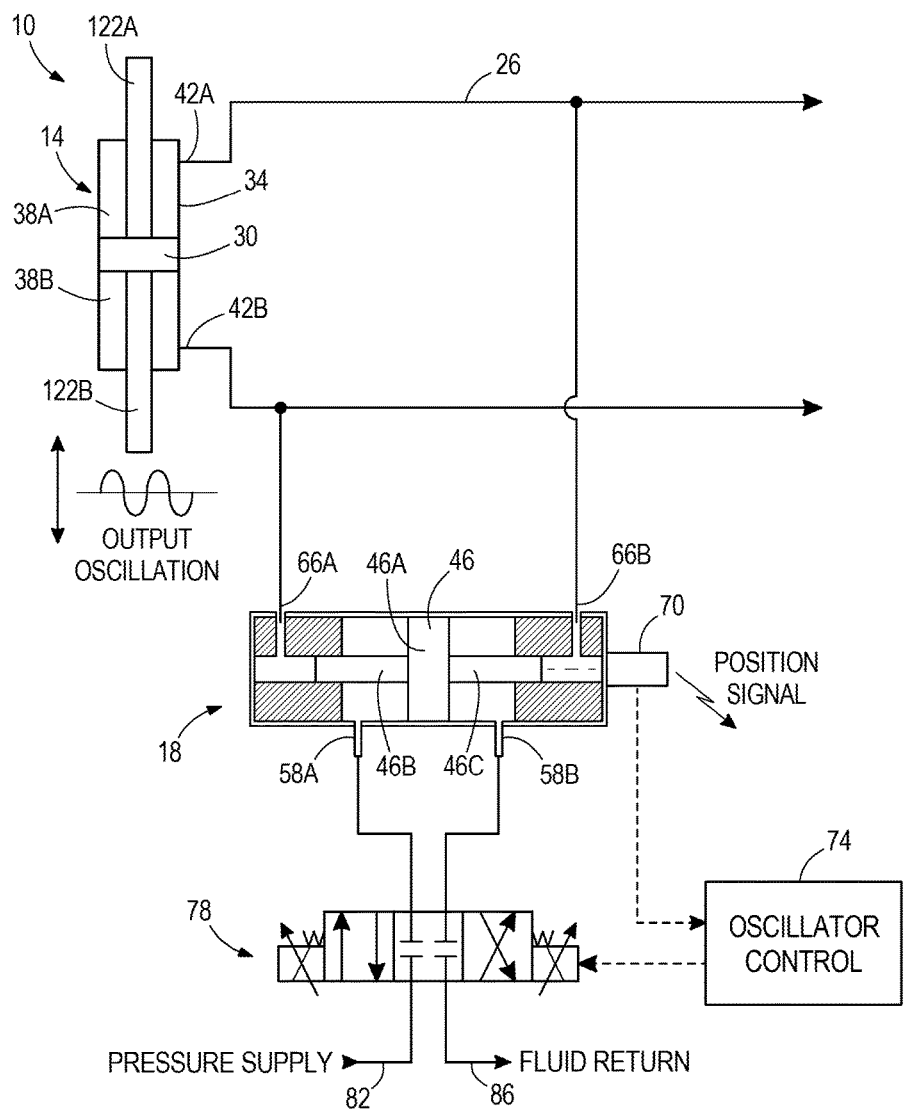
FIG. 3 is a schematic diagram of a portion of the hydraulic system of FIG. 1, with a pressure-driven actuator including a double-rod cylinder.
Figure 4:
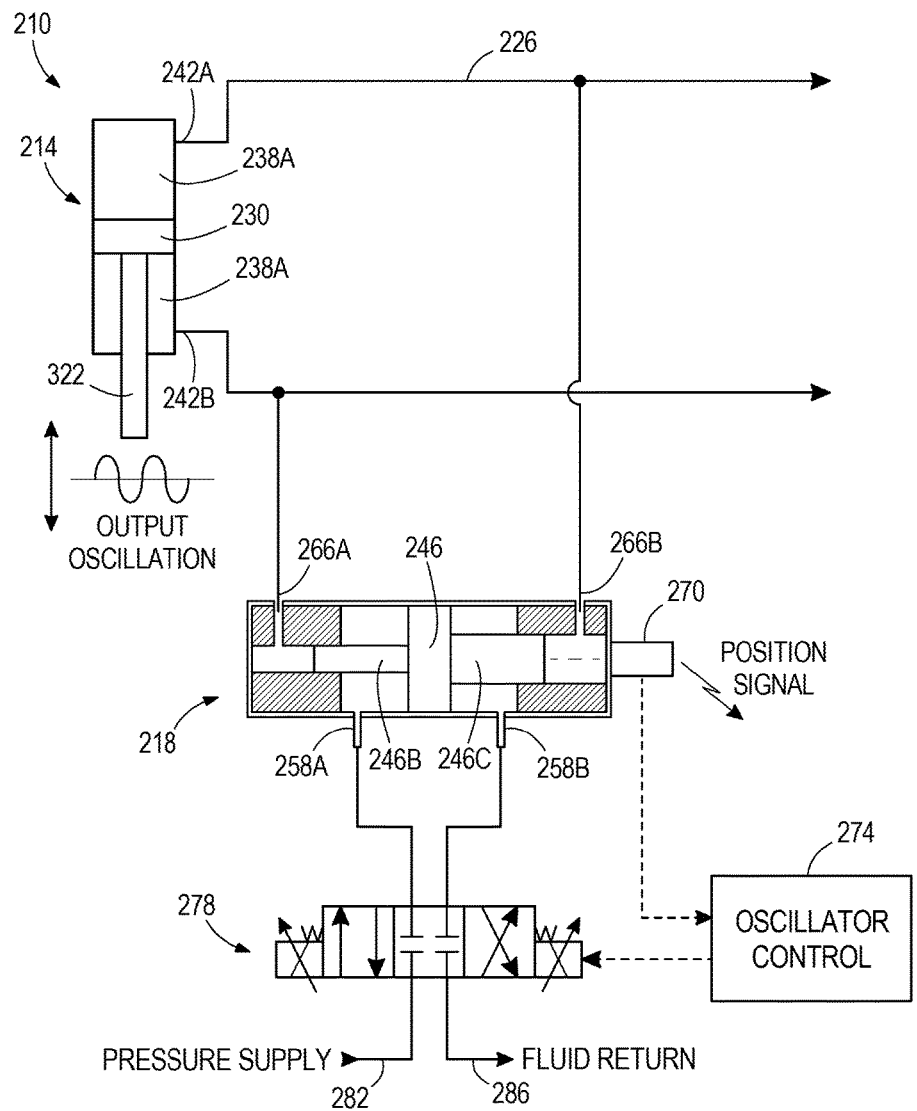
FIG. 4 is a schematic diagram of a portion of a hydraulic system with a pressure-driven actuator including a single-rod cylinder.

The piston 30 shown in FIGS. 1-3 is a double rod, double-acting cylinder (i.e., includes two opposing piston rods 122A, 122B; includes a port 42A, 42B at each end). Therefore, fluid in both of the first and second chambers 38A, 38B acts on a similar cross-sectional area of the piston 30. As shown in FIG. 4, the hydraulic system 210 may include a pressure-driven actuator 214 with a piston 230 in the form of a single rod, double-acting cylinder (i.e., includes only a single piston rod 322; includes a port 242A, 242B at each end). When acting to move the piston 230, fluid within the first chamber 238A requires a different pressure than fluid within the second chamber 238B to produce a similar displacement of the piston 230. In order to accommodate such a difference, the vibratory actuator 218 may be modified to increase the size of the second auxiliary portion 246C of the piston 246 while maintaining the size of the first auxiliary portion 246B. In other words, the second auxiliary piston is larger than the first auxiliary piston 246B. Therefore, movement of the piston 246 produces the appropriate fluid displacement necessary to move the piston 230 the desired amount, regardless of the direction of travel. Except as otherwise described, like elements of FIG. 4 are labeled with like reference numerals incremented by 200.

Various features of the invention are set forth in the following claims.

What is claimed is:

1. A hydraulic system comprising:
    a pressure-driven actuator operable to provide a mechanical output in response to a pressure input;
    a single hydraulic circuit communicating with the pressure-driven actuator;
    a vibratory actuator in the single hydraulic circuit and operable to generate a first component of the mechanical output at a first frequency; and
    a hydraulic supply apparatus separate from the vibratory actuator, in the single hydraulic circuit, and operable to generate a second component of the mechanical output at a second frequency less than the first frequency.

2. The hydraulic system of claim 1, wherein the vibratory actuator is operable to generate the first component of the mechanical output at a first displacement magnitude, and wherein the hydraulic supply apparatus is operable to generate the second component of the mechanical output at a second displacement magnitude, greater than the first displacement magnitude.

3. The hydraulic system of claim 1, wherein the vibratory actuator and the hydraulic supply apparatus are operable to simultaneously provide the first and second components of the pressure input to the pressure-driven actuator.

4. The hydraulic system of claim 1, further comprising a controller operable to actuate the vibratory actuator and the hydraulic supply apparatus to deliver hydraulic fluid pressure to the pressure-driven actuator.

5. The hydraulic system of claim 1, further comprising an oscillator controller operable to actuate the vibratory actuator to deliver hydraulic fluid pressure to the pressure-driven actuator, and a motion controller operable to actuate the hydraulic supply apparatus to deliver hydraulic fluid pressure to the pressure-driven actuator.

6. The hydraulic system of claim 1, further comprising a first pressure source operable to selectively provide the vibratory actuator with pressurized hydraulic fluid, and a second pressure source operable to selectively provide the hydraulic supply apparatus with pressurized hydraulic fluid.

7. The hydraulic system of claim 1, wherein the vibratory actuator includes:
    a piston chamber housing a piston and including a first inlet, a second inlet, a first outlet, and a second outlet; and
    a valve operable to selectively provide pressurized fluid to one of the first inlet or the second inlet.

8. The hydraulic system of claim 1, wherein the mechanical output comprises only the first component of the mechanical output, only the second component of the mechanical output, or a combination of the first and second components of the mechanical output.

9. The hydraulic system of claim 1, wherein the pressure-driven actuator includes a piston.

10. The hydraulic system of claim 1, wherein the hydraulic supply apparatus includes a pump.

11. The hydraulic system of claim 1, wherein the hydraulic supply apparatus includes a valve.

12. A method of operating a hydraulic system to provide a mechanical output having an oscillatory component and a non-oscillatory component, the hydraulic system comprising a single hydraulic circuit communicating with a pressure-driven actuator, the method comprising:

actuating a vibratory actuator in the single hydraulic circuit to generate the oscillatory component of the mechanical output; and simultaneously actuating a hydraulic supply apparatus separate from the vibratory actuator and in the single hydraulic circuit to generate the non-oscillatory component of the mechanical output.

13. The method of claim 12, further comprising providing an input signal to a controller prior to actuating the vibratory actuator and the hydraulic supply apparatus, wherein the controller provides output signals to actuate the vibratory actuator and the hydraulic supply apparatus.

14. The method of claim 12, wherein the vibratory actuator includes a piston chamber housing a piston and a valve operable to selectively provide pressurized fluid to one of a first inlet or a second inlet of the piston chamber, wherein actuating the vibratory actuator further comprises:

providing pressurized fluid via the valve to the first inlet, moving the piston in a first direction; and providing pressurized fluid via the valve to the second inlet, moving the piston in a second direction.

15. The method of claim 14, wherein moving the piston in the first direction moves a piston of the pressure-driven actuator in a first direction, and wherein moving the piston in a second direction moves the piston of the pressure-driven actuator in a second direction.

16. The method of claim 14, wherein the vibratory actuator further includes a position sensor, and wherein providing pressurized fluid via the valve further comprises:

providing a signal indicative of the actual location of the piston from the position sensor to a controller;

comparing the actual location of the piston to a desired location of the piston with the controller; and actuating the valve to provide pressurized fluid to the piston chamber to move the piston from the actual position to the desired position.

17. The method of claim 16, wherein the desired position of the piston is variable with respect to time between a first position and a second position to oscillate the piston between the first position and the second position.

18. The method of claim 12, wherein the hydraulic supply apparatus is a hydraulic pump, and wherein actuating the hydraulic supply apparatus includes actuating the pump to move hydraulic fluid.

19. The method of claim 12, wherein the hydraulic supply apparatus is a valve in communication with a high pressure source and wherein actuating the hydraulic supply apparatus includes actuating the valve to move hydraulic fluid.

20. The method of claim 12, wherein the pressure-driven actuator is a hydraulic piston, and wherein the hydraulic piston oscillates and translates within a piston chamber to produce the mechanical output.

* * * * *